C. K. HUTHSING.
HOSE CONSTRUCTION.
APPLICATION FILED MAR. 5, 1913.
1,104,508.
Patented July 21, 1914.
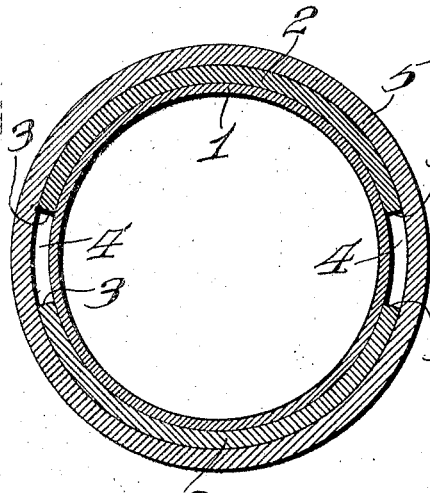
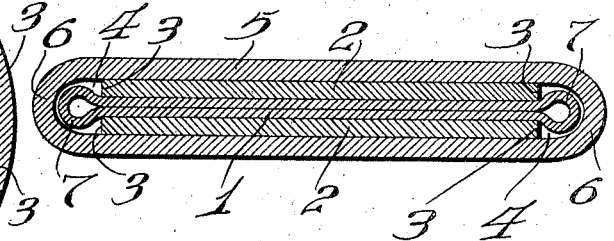
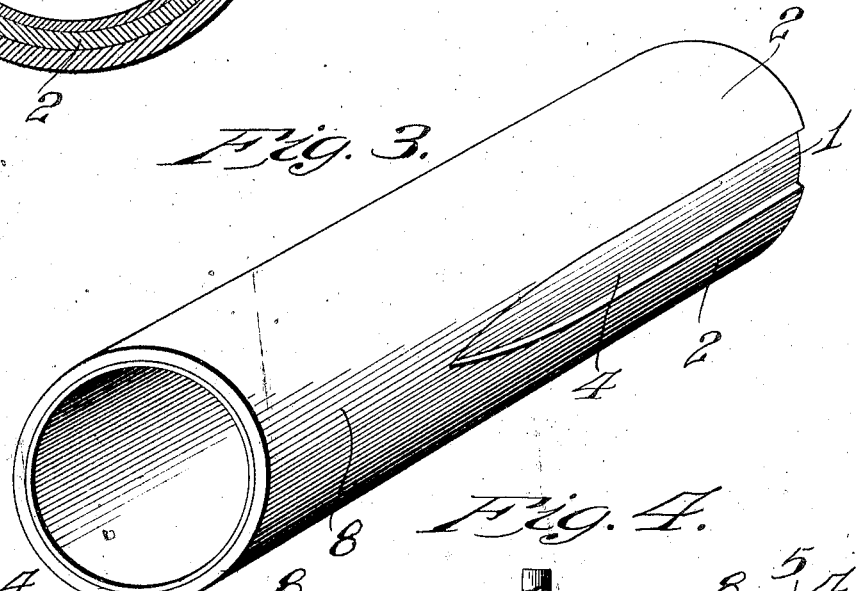
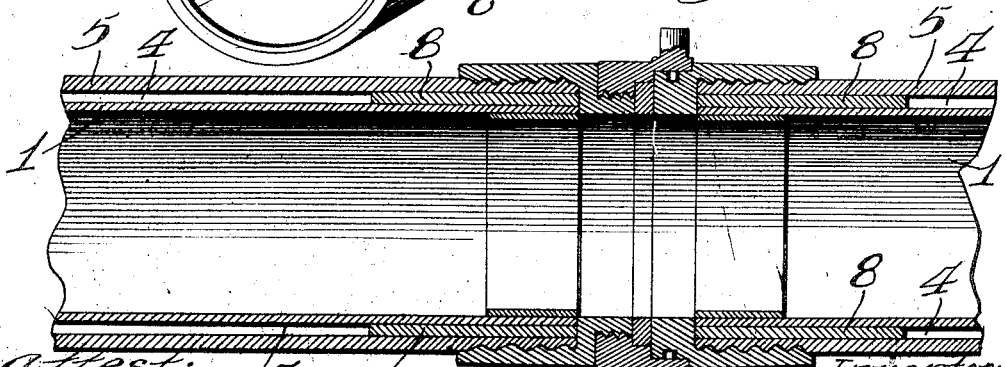
Inventor:
Charles K. Huthsing.

UNITED STATES PATENT OFFICE.

CHARLES K. HUTHSING, OF ST. LOUIS, MISSOURI.

HOSE CONSTRUCTION.

1,104,508.  Specification of Letters Patent.  Patented July 21, 1914.

Application filed March 5, 1913. Serial No. 751,992

*To all whom it may concern:*

Be it known that I, CHARLES K. HUTHSING, a citizen of the United States of America, residing in the city of St. Louis and State of Missouri, have invented certain new and useful Improvements in Hose Construction, of which the following is a specification.

The primary object of this invention is to provide improved means in hose construction, such as fire hose, whereby the creasing of the hose, when reeled or when short bends are made therein when flattened, is not detrimental to the inner lining or tubing thereof.

Another object is to provide improved means whereby the hose is made more pliable for reeling.

A further object is to provide means for relieving the weight from the creased portions of the inner lining or tube of a hose, which weight is brought about by reason of the hose being laid upon itself when not in use.

A still further object is to provide an improved fire hose of such construction that the inner tube or lining can be more easily inserted and drawn into the outer lining.

Other and further objects will appear in the specification, and be specifically pointed out in the appended claims, reference being had to the accompanying drawings exemplifying the invention, and in which, Figure 1 is a transverse section through a fire hose, showing this improved construction applied thereto. Fig. 2 is a transverse section of this improved fire hose when flattened. Fig. 3 is a perspective view, slightly reduced in size, of a portion of one end of a length of the inner lining or tube of fire hose, showing this improvement. Fig. 4 is a horizontal section, showing two sections of hose coupled together.

Referring to the drawings: 1 designates the inner tube or lining of a fire hose, which is preferably made of rubber. Secured thereto, outside thereof, and on opposite sides, are a pair of filling strips 2, said strips being of such width that they will not meet at their adjacent side edges 3, thus forming a pair of longitudinal recesses 4, said recesses being diametrically opposed to each other. Mounted on the outside of the inner lining 1 and the filling strips 2 is the outer lining or casing 5.

In hose of any size, such as fire hose, when said hose is not in use it will collapse, providing there is not enough reinforcing to sustain the hose in its circular formation. But in the majority of instances, hose of this type, being flexible, is of a collapsible formation so it can be readily reeled when not in use. When the crease lines are once formed by flattening, these crease lines will always be followed whenever the hose is collapsed. For this reason the bends of the hose forming the creases are so abrupt that friction is caused in the material of the hose adjacent the bends, especially in the inner rubber lining or tube, so that the adhesion is broken, and in a short while the hose will leak.

Referring to Fig. 2, which shows the hose in a flattened condition, creases 6 are formed adjacent the longitudinal recesses 4. And bends 7 will be formed on the inner lining 1 in the recesses 4. But by reason of the filling strips 2, the weight that might be applied to the hose when in its flattened condition will be sustained by said filling strips, the bends 7 of the inner lining 1 being protected in the recesses 4. As no pressure is brought to bear on said bends 7, said bends will assume more of a natural curve. Therefore, said bends will not be subjected to the abrupt bending friction as they would be if they were squeezed together.

In order to provide a good coupling connection when lengths of hose are coupled together, it is preferable to have the strips 2 adjoin each other adjacent the ends of the length, as shown at 8 in Figs. 3 and 4. So that when lengths of hose are coupled together, there will be a solid foundation of fabric entirely around the hose so that a solid joint will be formed.

It is readily seen how new inner linings of this improved construction can be readily inserted into old outer casings. And, furthermore, this improved construction of inner lining can be more readily drawn into an outer casing by reason of the filling strips having a space formed between their side edges, and a certain amount of looseness will be formed when drawing the inner lining into the outer casing.

By having the filling strips 2 merged together adjacent the ends of each length of inner tube 1, said strips, of course, being gummed to said inner tube, when lengths of hose are coupled together and water pressure is maintained in the hose, the portions 8 of the filling strips 2, being gummed to the inner tube 1, will prevent the water from getting in between the inner tube 1 and said portions 8. These filling strips 2, when applied to the outside of the rubber inner tube 1, serve as reinforcements or stiffeners to the inner tube, as, when the inner tube is being mounted in the outer lining 5, it being pulled in, considerable strain is given to the inner tube. These strips, therefore, relieve the strain on the inner tube. This improved construction of inner tube provides for the tube being expansible, the portion of the tube adjacent the recesses or spaces 4 expanding against the outer lining 5 when pressure is applied to the hose.

What I claim is:

1. In a hose, a removable lining adapted to be inserted into a casing, said lining having a pair of filling strips formed on the outside thereof, said filling strips adapted to be spaced apart, the spacing apart of said filling strips forming a pair of diametrically opposed longitudinal recesses between said lining and said casing, said filling strips being of such width as to almost surround said lining.

2. A hose comprising an inner lining and an outer casing, said inner lining adapted to be removable, a pair of filling strips mounted on the outside of said inner lining, said strips being apart from each other forming a pair of longitudinal spaces said strips being of such width as to almost surround said inner lining, said spaces providing means for allowing said inner lining to be expanded.

3. A hose comprising an inner lining and an outer casing, said inner lining having a pair of longitudinal filling strips mounted on the outside thereof, said strips being apart from each other forming a pair of longitudinal spaces, said spaces allowing said inner lining to expand and tightly fit said outer casing when said inner lining is under pressure said strips being of such width as to almost surround said inner lining.

4. In a hose, an inner lining adapted to be inserted into an outer casing, said inner lining having a pair of filling strips formed on the outside thereof, said filling strips adapted to be spaced apart, the spacing apart of said filling strips forming a pair of diametrically opposed longitudinal recesses, said filling strips adapted to adjoin at a point adjacent the ends of said inner lining.

5. A hose having a lining and a casing, a pair of filling strips located between said lining and said casing, said strips forming longitudinal spaces between said lining and said casing, said strips being of such width as to almost surround said lining.

6. A hose having a lining and a casing, a pair of filling strips secured to said lining or said casing, said lining adapted to be removably inserted in said casing, said strips being spaced apart from each other forming a pair of longitudinal spaces between said lining and said casing when said lining and said casing are mounted together, said strips being of such width as to almost surround said lining.

7. A hose comprising an inner lining and an outer casing, said inner lining adapted to be inserted in said outer casing, a pair of filling strips mounted on the outside of said inner lining, said strips being spaced apart from each other forming a pair of longitudinal spaces between said inner lining and said casing said strips being of such width as to almost surround said inner lining, said filling strips providing for a reinforcement to said inner lining while said inner lining is being inserted in said outer casing.

8. A hose comprising an inner lining and an outer casing, a pair of filling strips arranged lengthwise between said lining and said casing, said strips being spaced apart from each other and secured to said inner lining, said strips being of such width as to almost surround said inner lining.

9. An inner lining for a hose, a pair of opposed filling strips secured to the outside of said lining, said strips being arranged lengthwise on said lining and being of such width as to almost surround said inner lining.

10. A hose comprising an inner lining and an outer casing, said inner lining being constructed of rubber, a pair of opposed filling strips secured to the outside of said inner lining, said strips extending lengthwise on said inner lining and being spaced apart at their adjacent side edges, said strips being of such width as to almost surround said inner lining, said strips adapted to reinforce the portions of the inner lining which they cover, thereby forming unreinforced portions on said inner lining, said inner lining when containing a fluid adapted to expand at the unreinforced portions thereof, said inner lining when flattened adapted to be creased on said unreinforced portions.

11. A collapsible tubular lining for a hose having a pair of opposed filling strips secured to the outside thereof, said strips running lengthwise of said lining, said strips being of such width as to almost surround said lining, said strips forming means for causing said lining to crease therebetween.

12. A collapsible tubular lining for a hose having a pair of opposed filling strips formed thereon, said strips running lengthwise of said lining, said strips being of such width as to almost cover one of the surfaces of said lining, said lining adapted to crease along the adjacent edges of said strips.

CHAS. K. HUTHSING.

In the presence of—
H. G. FLETCHER,
M. C. HAMMON.